(12) United States Patent
Chen

(10) Patent No.: US 11,777,323 B2
(45) Date of Patent: Oct. 3, 2023

(54) SEQUENTIAL POWER DISCHARGE FOR BATTERIES IN A POWER SYSTEM

(71) Applicant: Entrantech Inc., Gilroy, CA (US)

(72) Inventor: Kong-Chen Chen, Gilroy, CA (US)

(73) Assignee: Entrantech Inc., Gilroy, CA (US)

(\*) Notice: Subject to any disclaimer, the term of this patent is extended or adjusted under 35 U.S.C. 154(b) by 0 days.

(21) Appl. No.: 17/884,984

(22) Filed: Aug. 10, 2022

(65) Prior Publication Data

US 2022/0393488 A1 Dec. 8, 2022

Related U.S. Application Data

(63) Continuation-in-part of application No. 17/402,435, filed on Aug. 13, 2021, and a continuation-in-part of application No. 17/398,355, filed on Aug. 10, 2021, now Pat. No. 11,489,455.

(60) Provisional application No. 63/356,484, filed on Jun. 29, 2022, provisional application No. 63/065,341, filed on Aug. 13, 2020.

(51) Int. Cl.
*H02J 7/00* (2006.01)
*B60L 53/80* (2019.01)
*H02M 1/00* (2006.01)
*H02M 7/25* (2006.01)

(52) U.S. Cl.
CPC ............ *H02J 7/0025* (2020.01); *B60L 53/80* (2019.02); *H02J 7/00304* (2020.01); *H02J 7/00308* (2020.01); *H02J 7/00309* (2020.01); *H02M 1/0029* (2021.05); *H02M 7/25* (2013.01)

(58) Field of Classification Search
CPC ....................................................... H02J 7/0025
USPC ............................................................. 307/72
See application file for complete search history.

(56) References Cited

U.S. PATENT DOCUMENTS

| | | |
|---|---|---|
| 5,635,773 A | 6/1997 | Stuart |
| 5,786,642 A | 7/1998 | Wilhelm |
| 6,320,359 B1 | 11/2001 | Nagaya et al. |
| 6,798,666 B1 | 9/2004 | Alexander et al. |
| 8,148,844 B2 | 4/2012 | Pan |
| 10,840,735 B1 | 11/2020 | Cooper |
| 11,183,851 B1 | 11/2021 | Chen |
| 11,476,657 B2 | 10/2022 | Chen |
| 11,489,455 B2 | 11/2022 | Chen |
| 11,605,970 B2 | 3/2023 | Chen |
| 2004/0085043 A1 | 5/2004 | Germagian et al. |
| 2005/0225955 A1 | 10/2005 | Grebenkemper et al. |
| 2005/0237724 A1 | 10/2005 | Fiorentino et al. |

(Continued)

FOREIGN PATENT DOCUMENTS

WO WO-2011035326 A1 3/2011

OTHER PUBLICATIONS

International Search Report & Written Opinion dated May 3, 2022 (ISA/US) in PCT Application PCT/US2021/059792.

(Continued)

*Primary Examiner* — Joseph Chang
(74) *Attorney, Agent, or Firm* — Weaver Austin Villeneuve & Sampson LLP

(57) ABSTRACT

The battery pack of an EV is partitioned into multiple removeable and replaceable batteries to mitigate challenges associated with the power charging of battery in an EV. A set of control switches are linked in a control chain to control an orderly discharge of energy from the batteries disposed in the battery pack.

33 Claims, 8 Drawing Sheets

(56) References Cited

U.S. PATENT DOCUMENTS

| | | |
|---|---|---|
| 2006/0244620 A1 | 11/2006 | Sotiriou |
| 2007/0073420 A1 | 3/2007 | Lanni |
| 2007/0273210 A1 | 11/2007 | Wang et al. |
| 2011/0053394 A1 | 3/2011 | Hood, III et al. |
| 2012/0118602 A1 | 5/2012 | Remmert |
| 2012/0188806 A1 | 7/2012 | Tamura et al. |
| 2012/0212078 A1 | 8/2012 | Lanni |
| 2013/0015714 A1 | 1/2013 | Kwok |
| 2015/0022001 A1 | 1/2015 | Goei et al. |
| 2015/0048767 A1 | 2/2015 | Takezawa |
| 2015/0054343 A1 | 2/2015 | Cui |
| 2015/0348733 A1 | 12/2015 | Shi et al. |
| 2018/0212420 A1 | 7/2018 | Chen |
| 2018/0226797 A1 | 8/2018 | Galin et al. |
| 2019/0081571 A1 | 3/2019 | Chung et al. |
| 2019/0229546 A1 | 7/2019 | Hartl |
| 2019/0288532 A1* | 9/2019 | Mattos ............... H02J 7/0034 |
| 2020/0381917 A1* | 12/2020 | Takeda ............. H01M 50/574 |
| 2022/0014014 A1 | 1/2022 | Chen |
| 2022/0052618 A1 | 2/2022 | Chen |
| 2022/0052619 A1 | 2/2022 | Chen |
| 2022/0094191 A1 | 3/2022 | Suzuki et al. |
| 2022/0158482 A1 | 5/2022 | Chen |
| 2022/0190638 A1 | 6/2022 | Raju |
| 2022/0263427 A1 | 8/2022 | Willson et al. |
| 2023/0050719 A1 | 2/2023 | Chen |

OTHER PUBLICATIONS

U.S. Notice of Allowance dated Jun. 9, 2022 in U.S. Appl. No. 16/950,882.
U.S. Advisory Action dated Mar. 22, 2023 in U.S. Appl. No. 17/402,435.
U.S. Corrected Notice of Allowance dated Feb. 14, 2023 in U.S. Appl. No. 17/667,457.
U.S. Corrected Notice of Allowance dated Jul. 18, 2022 in U.S. Appl. No. 17/398,355.
U.S. Corrected Notice of Allowance dated Jun. 21, 2022 in U.S. Appl. No. 16/950,882.
U.S. Corrected Notice of Allowance dated Nov. 17, 2022 in U.S. Appl. No. 17/667,457.
U.S. Corrected Notice of Allowance dated Oct. 6, 2022 in U.S. Appl. No. 17/398,355.
U.S. Corrected Notice of Allowance dated Sep. 20, 2022 in U.S. Appl. No. 16/950,882.
U.S. Final office Action dated Jan. 19, 2023 in U.S. Appl. No. 17/402,435.
U.S. Non-Final office Action dated Aug. 24, 2022 in U.S. Appl. No. 17/402,435.
U.S. Non-Final office Action dated Dec. 27, 2022 in U.S. Appl. No. 17/402,450.
U.S. Notice of Allowance dated Jul. 7, 2022 in U.S. Appl. No. 17/398,355.
U.S. Notice of Allowance dated Feb. 15, 2022 in U.S. Appl. No. 16/950,882.
U.S. Notice of Allowance dated Jul. 27, 2021 in U.S. Appl. No. 17/062,413.
U.S. Notice of Allowance dated Nov. 3, 2022 in U.S. Appl. No. 17/667,457.
International Preliminary Report on Patentability dated Jun. 1, 2023, in Application No. PCT/US2021/059792.
U.S. Notice of Allowance dated Jul. 5, 2023 in U.S. Appl. No. 17/402,435.
U.S. Notice of Allowance dated Jun. 7, 2023 in U.S. Appl. No. 17/402,450.

* cited by examiner

FIG. 1 An Exemplary Battery Module Power Discharging Configuration with Control Switch
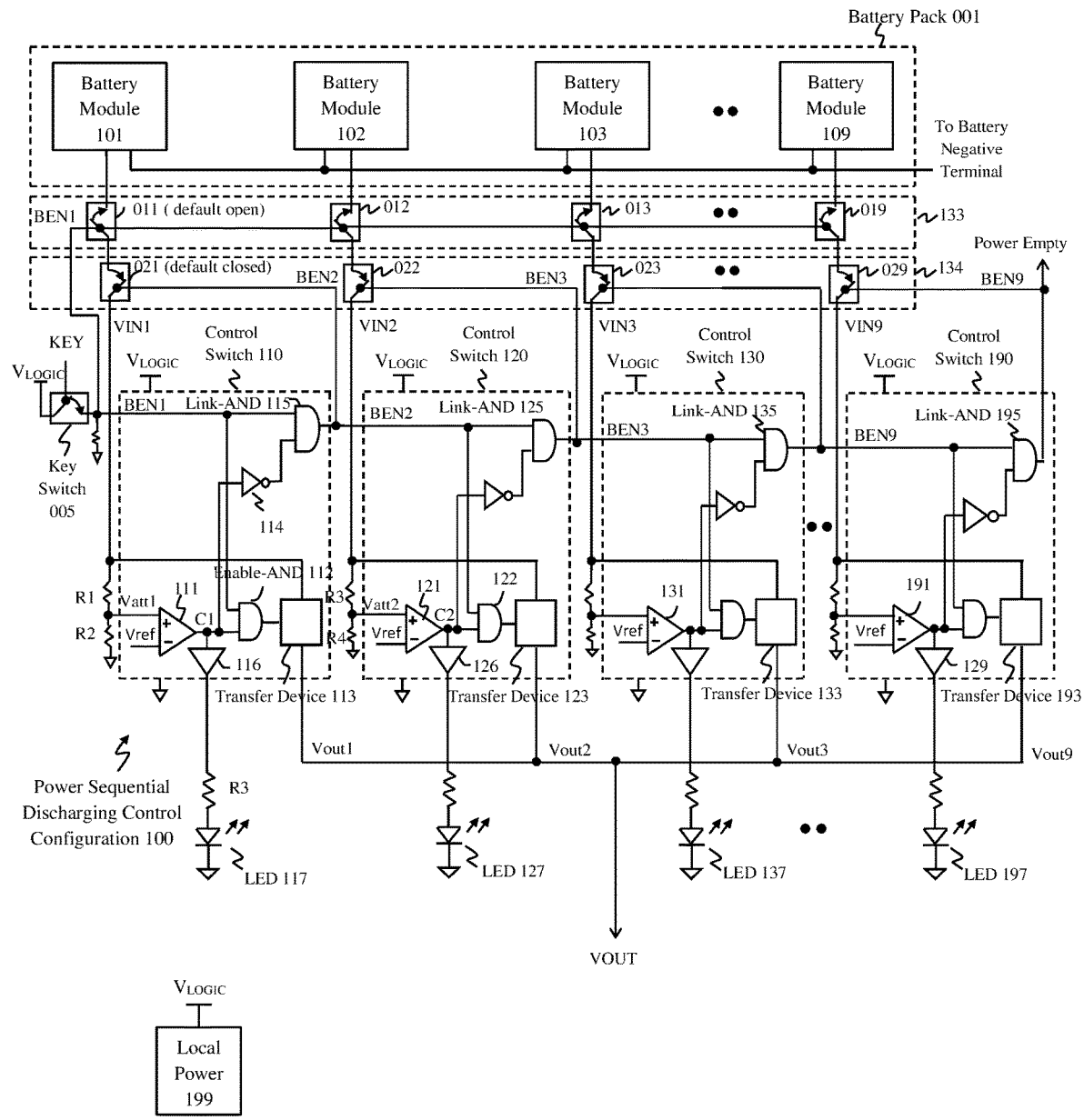

FIG. 2A Protection Device to Prevent Spurious Energy Discharge and Deep Energy Depletion for Battery Module
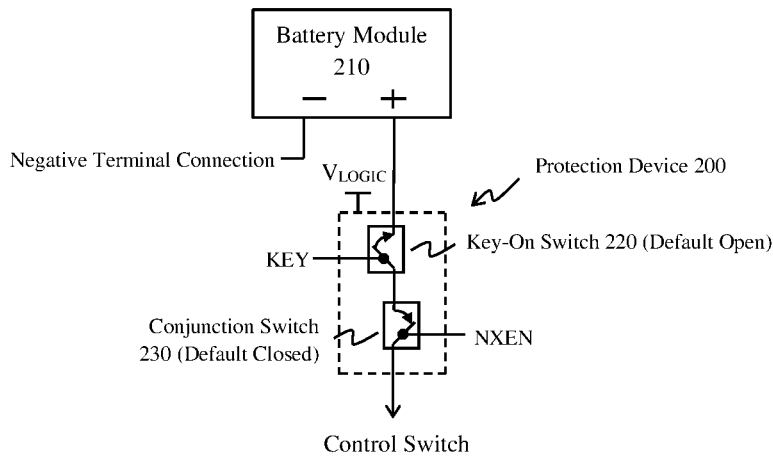
FIG. 2B An Alternative implementation of Protection Device for Battery Module
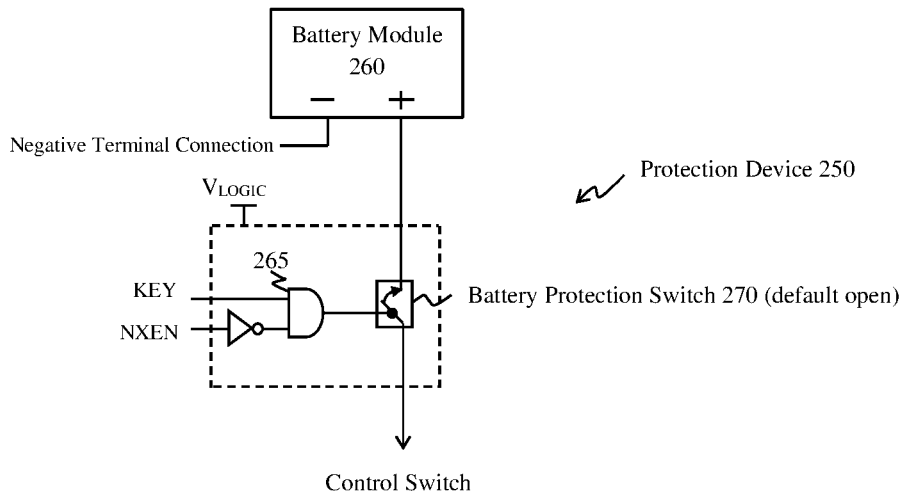

FIG. 3  An Exemplary Battery Module Discharging Control Switch in PMOS-FET Transfer Device
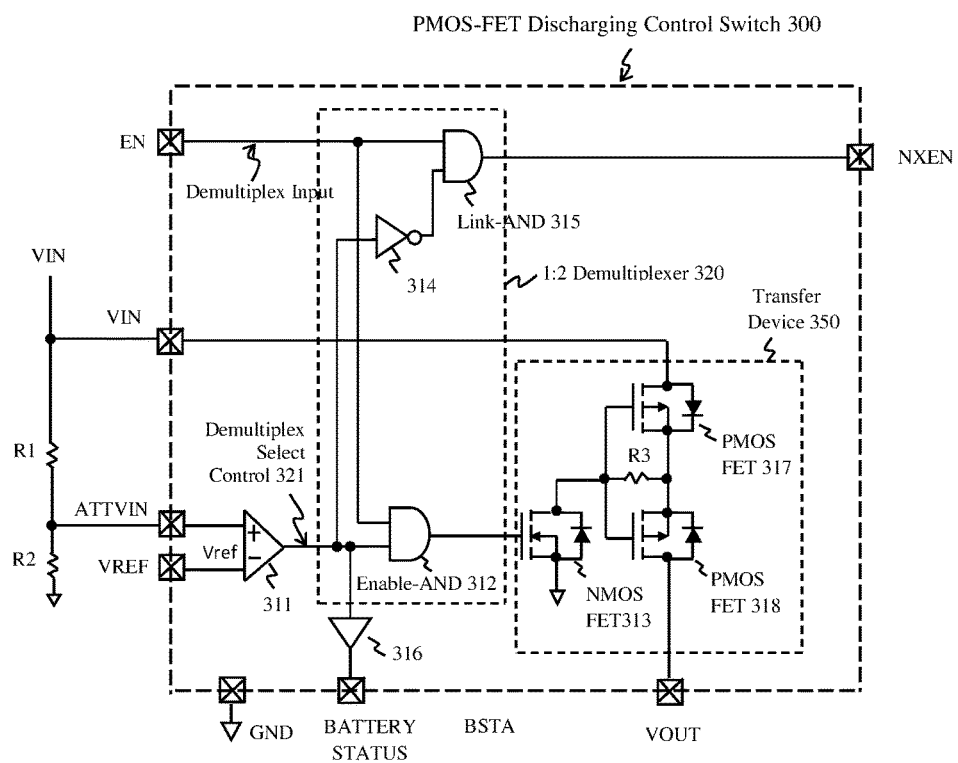

FIG. 4A  Logic Representation of a 1:2 Demultiplexer
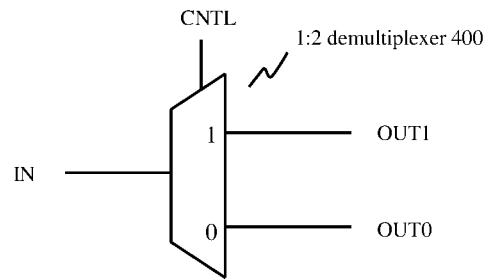
FIG. 4B  Application of 1:2 Demultiplexer in a Discharging Control Switch
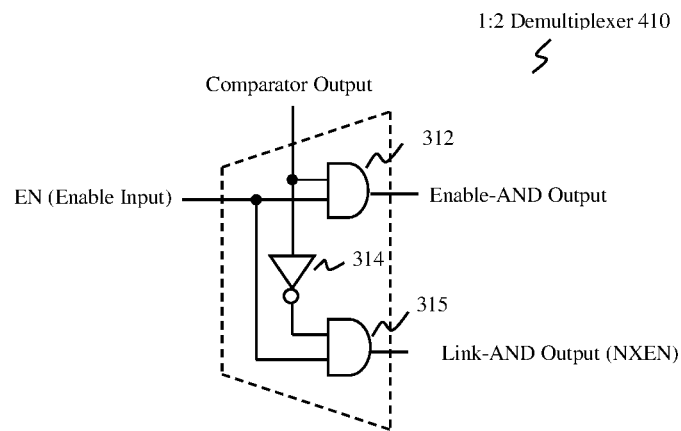

FIG. 5A  An Exemplary Control Switch Using Back-to-Back NMOS-FETs as Transfer Device
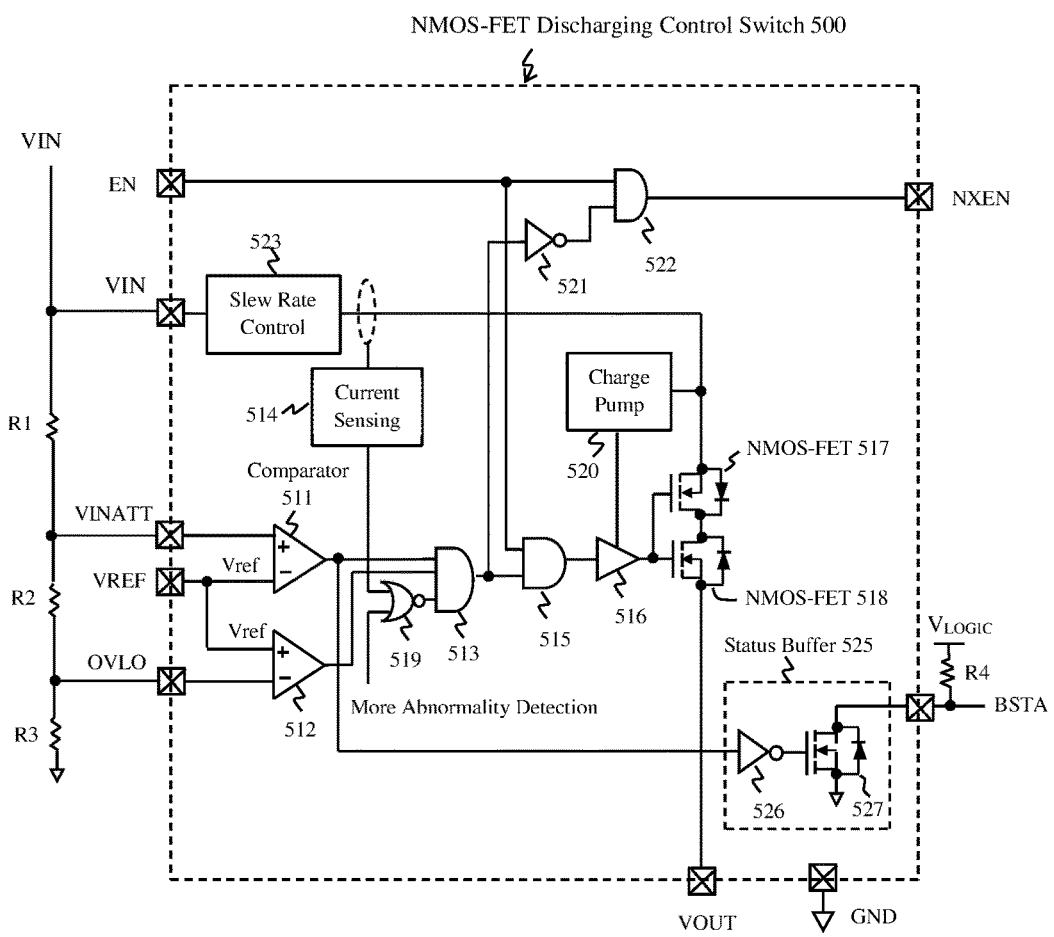

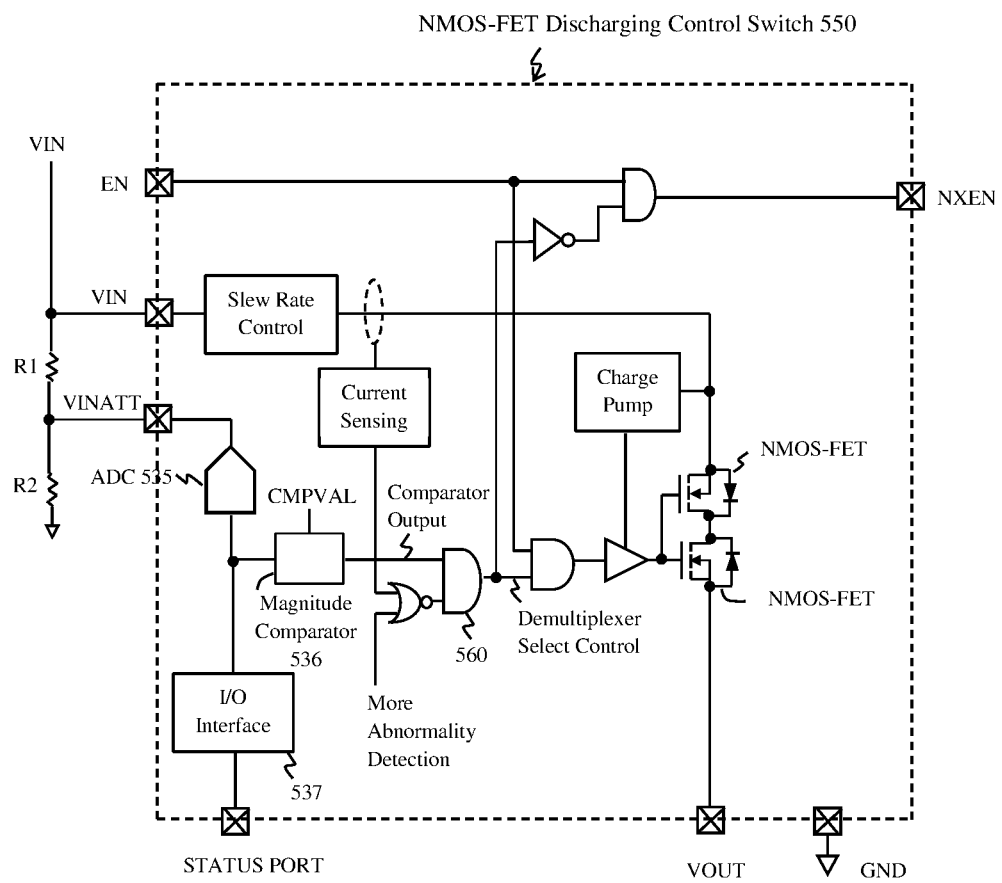
FIG. 5B  An Exemplary Control Switch Using ADC to Compose a Comparison Device

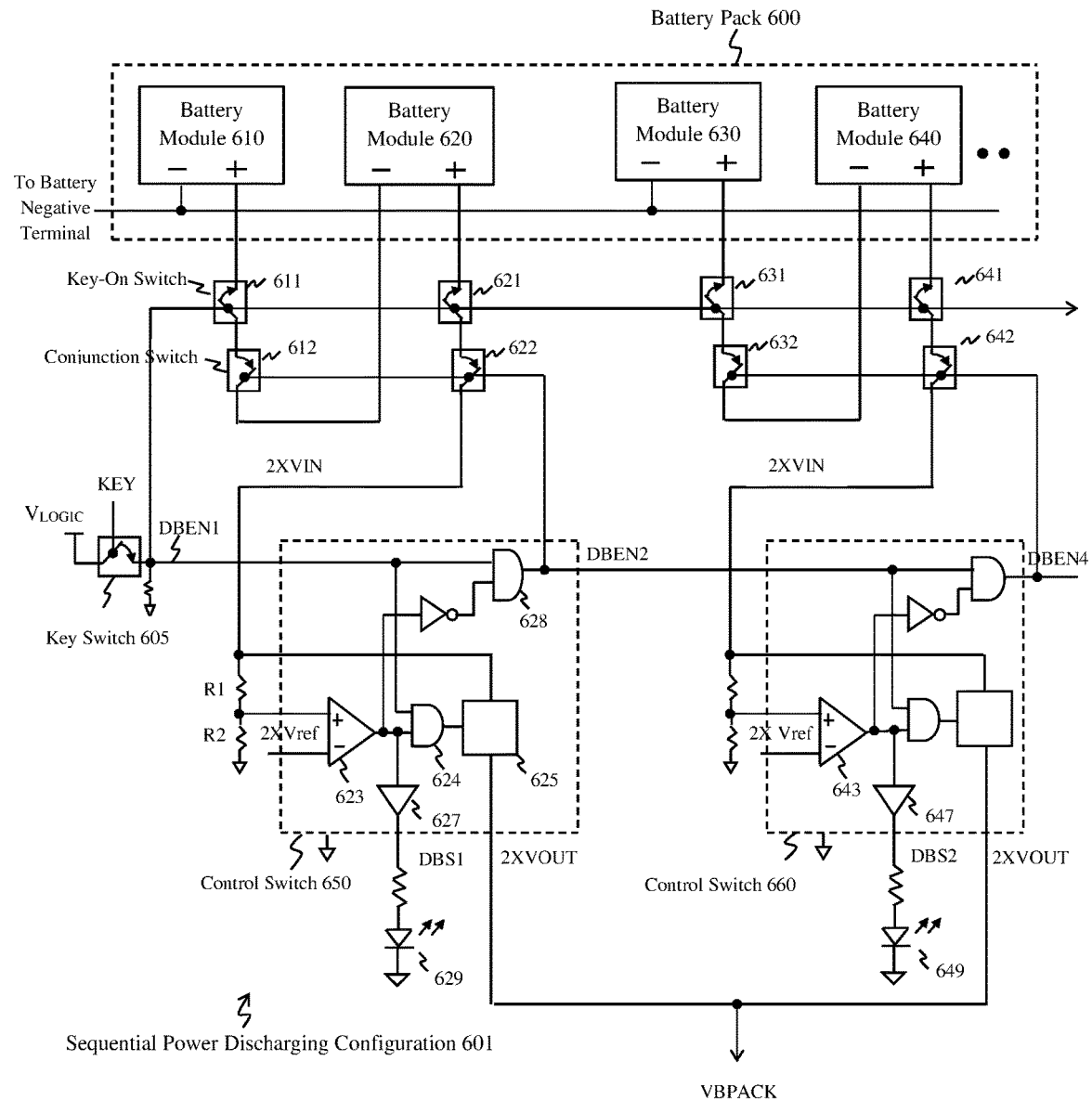
FIG. 6 An Exemplary Power Discharging Control Configuration to Double Voltage Output of a Battery Pack

FIG. 7  An Exemplary Power Discharging Control Configuration to Double Output Current of a Battery Pack
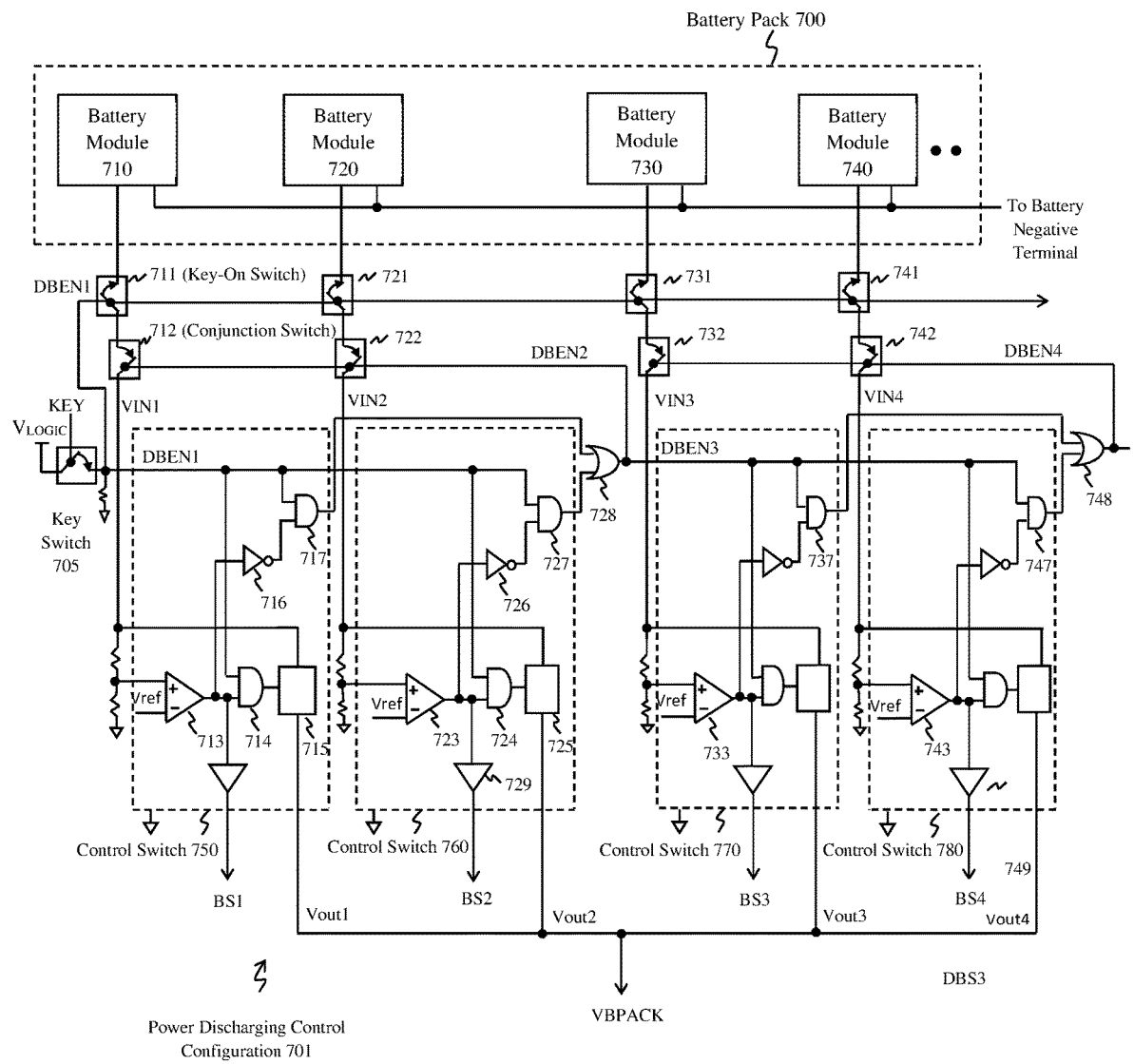

SEQUENTIAL POWER DISCHARGE FOR BATTERIES IN A POWER SYSTEM

CROSS REFERENCE TO RELATED APPLICATIONS

This application claims priority, under 35 U.S.C. § 119, from U.S. Provisional Application No. 63/356,484, filed on Jun. 29, 2022, entitled "Apparatus for Battery Power Sequential Discharging Control"; the present application is a continuation-in-part of application Ser. No. 17/667,457, filed on Feb. 8, 2022, the contents of both of which are incorporated herein by referred in their entirety.

FIELD OF THE INVENTION

The present invention relates to sequential power discharging control and protection for a group of power storage devices in a power system.

BACKGROUND

Electric vehicles (EV) are ready to take off. However, the limited power storage capacity in EV, i.e. its battery pack, limits the EV acceptance. Although the battery pack in an EV can be fully charged at home by using level-1 or level-2 AC chargers, the driving range and the driving routes of EV are still dictated by the availability of public fast charging stations when on extended trips.

To resolve this limitation, one approach is to construct more public charging infrastructure for EV, such as the high-voltage level-3 DC fast charging stations being provided by Tesla around many places. It is a huge investment. In addition, the level-3 chargers often use proprietary technology that may not be compatible among different EV makers.

Another solution being explored by EV manufacturers is the use of battery pack swapping technique. Some EV, such as the Model-S by Tesla, lets the entire battery pack in the EV to be swappable at a service station. When energy in a swappable battery pack is used up, driver could drive the EV to a battery swapping facility where the entire EV is lifted up by a robot to remove the entire battery pack underneath the vehicle and to replace it with a fully charged one. It may not be cost-effective to build a battery pack swapping facility; moreover, in case there is energy still in the battery pack but is simply insufficient to reach a destination, swapping the battery pack is wasteful for consumers and may not be an efficient way in the use of energy.

Automobiles using combustion engine can fuel gas in a convenient gas station with gasolines from different refineries, regardless of the makers of car. However, EVs from different manufacturers are often equipped with battery of different capacities, in different configurations, even with different charging connectors to make the fast chargers incompatible among different EVs. EV drivers often need to search for a nearby fast charging station that provides services having a compatible charger when power in an EV battery pack runs low. It would be advantageous if the EV battery charging could be analogously as convenient as car fueling gas in a gas station without being limited by any specific fast charging facility when battery pack requires a charging.

SUMMARY

In an EV, a large number of battery cells are connected serially and/or parallelly into a battery module. The battery modules are then assembled into a battery pack to source electric power for EV.

The battery modules in a battery pack are configured to be conveniently removable and replaceable, so that an energy depleted battery module could be easily removed from the battery pack and replaced with a fully charged one. The approach may resolve the insufficient battery capacity issue encountered by EV. The replacement may be done by drivers themselves or through a battery replacement service station. In an embodiment, a sequential discharging configuration is depicted, where a set of battery modules being partitioned in a battery pack are controlled by a set of associated control switches so that energy in the battery modules is discharged sequentially for EV use. The EV driver could perceive the energy usage of battery modules in battery pack, such as which battery module being in use, the number and the locations of battery modules with energy being used up, and the number of battery modules that still has energy available for driving to destination. In case, the EV does not have sufficient battery energy to reach its destination, some depleted battery modules can be either charged at a fast-charging station or easily replaced in a convenient battery service store that provides battery module replacement services, similar to fueling gas for automobile in a gas station. In case of any need to drive to a secluded area without battery service, drivers may carry a few spare battery modules on the road for battery replacement use. This could eliminate the EV mileage anxiety for EV owners or the would-be buyers.

In an embodiment, a discharging control switch which facilitates the sequential power discharging of battery modules in battery pack comprises a comparison device to monitor the energy level in an associated battery module, and a 1:2 demultiplexer to control the power transfer from the associated battery module through a transfer device to the battery pack output if the associated battery module has sufficient energy available, and when energy in the associated battery module is used up, it will automatically switch to a subsequent battery module that has sufficient energy available for output. A status buffer being coupled to the output of comparator may be used to indicate the energy status in the associated battery module. The discharging control switch is alternatively referred herein as a "control switch". The control switch may be implemented using discrete electronic devices or implemented as chiplet in a multiple-chip package. It may also be implemented using one or more integrated circuits.

There is an 'enable input' to the control switch, which is a 'control output' from a prior control switch in a control chain, which is a serial link by a group of control switches. If the enable input to a control switch is asserted, and if energy in an associated battery module is sufficient for output, then the control switch will activate its transfer device to transfer power from the battery module to the output of battery pack.

By connecting the control output from a prior control switch to the enable input of an active control switch, and connecting the control output from the active control switch to the enable input of a subsequent control switch, the serial connection links a group of control switches into a chain configuration to control the orderly power discharging of a set of battery modules in a battery pack automatically. These connections form a sequential discharging control chain and is alternatively referred herein as a "control chain", where energy in the set of battery modules is discharged sequentially in a pre-determined order in according with the connection sequence in the control chain.

The linking configuration among control switches form a power priority chain. However, priority control is not a key concern. From energy discharging point of view, all battery modules controlled by the control switches play equal role. The power priority is mainly to control an orderly discharge of energy among the set of battery modules in a battery pack.

In an embodiment, as key at EV is switched on, a control signal is asserted to enable a control switch coupled to the first battery module in the battery pack that has sufficient energy for output. As energy in the first battery module depletes, the control switch will assert a control output to activate a subsequent control switch according to the linking sequence of control switches in the control chain, where the subsequent control switch is the one coupled to a battery module in battery pack that has sufficient energy for output.

In case any battery modules without sufficient energy for output between the first battery module and the subsequent battery module, those drained battery modules will be skipped by the control chain. This is because the comparison device in a control switch associated with an energy drained battery module will output a logic low to assert the control output to enable a next control switch in control chain to check for if the output of comparison device in the next control switch is a logic high. This process will continue until reaching a control switch that detects sufficient energy in its associated battery module, then it will activate its transfer device to provide power for the battery pack. Such a power discharging process would proceed sequentially until energy in all battery modules in the battery pack are used up. A depleted battery module means the attenuated voltage output from a battery module falls below a reference level as monitored by the comparison device in the associated control switch.

Because any depleted or vacant battery modules in the battery pack would be skipped automatically by the control chain, this makes battery module replacement process much amiable without any concern about the replacement sequence or any ignorance not to replace a depleted battery module in the battery pack during battery service.

A status output port in the control switch indicates the power status of the coupled battery module. By checking the status outputs, EV driver could perceive the number of battery modules that still have sufficient energy for driving use. If the remaining battery modules have sufficient energy for the entire journey, the driver may wait until arriving at the destination to charge the depleted battery modules. Otherwise, some depleted battery modules may be swapped or replaced with the fully charged ones in a service stop, or charged in a fast-charging station.

The comparison device in a control switch may be a comparator composing of an operational amplifier which outputs a logic high or is saturated at an asserted state when its input voltage is higher than a reference voltage, and outputs a logic low or is saturated at a de-asserted state when its input voltage is lower than the reference voltage.

In an embodiment, the comparison device may be composed of an analog-to-digital converter (ADC) with the output of ADC being connected to a magnitude comparator to compare with a reference number reflecting the minimum voltage requirement of a battery module to generate an output signal similar to the output of comparator to control the power switching between control switches. The comparison output is asserted when output of ADC is higher than the reference number in the magnitude comparator. The reference number may be a hard-wired in control switch, or a value stored in ROM, EPROM, or EEPROM. The ADC output could also be observable externally through an I/O interface port in the control switch, such as I²C or controller area network (CAN) interface, rather than a single status bit in the status port, to provide a higher resolution for observing the available energy in a battery module.

In an embodiment, a protection device could be incorporated between a battery module and its associated control switch to prevent unnecessary power leakage when EV power is switched off and to prevent spurious over-depletion of a depleted battery module from degrading battery lifetime during EV power is switched on. The protection device may include two protection switches connected in series, where one protection switch, namely a key-on switch, is default normally-open and is closed when power to EV is keyed on. The other protection switch, namely a conjunction switch, is default normally-closed and will be open when energy in an associated battery module is used up. The two serial switches can be connected in any order. They can be combined into a single switch, namely a battery protection switch, controlled by an equivalent implementation of above two protection switches.

Standardization in the physical configuration and power capacity of battery module is desirable. It makes battery modules exchangeable among different EVs. The power capacity of battery modules may be standardized in one or more specific sizes, where a power-hungry EV may use a larger capacity one while a typical or smaller EV may use a regular capacity battery module.

In an embodiment, the battery modules and the associated control switches could be configured to boost output voltage and/or output current of a battery pack. This could be done by re-arranging the plurality of battery modules in the battery pack into multiple subgroups, and then connecting battery modules in each subgroup in series to raise the output voltage prior to connect a control switch to a subgroup of battery modules to enable the elevated voltage output. Similarly, it is possible to boost the output current of a battery pack by enabling a subgroup of control switches in a discharging control chain to activate its associated subgroup of battery modules in battery pack to output current concurrently.

To activate a subgroup of battery modules to output power concurrently, the enable control inputs to a subgroup of control switches associated with the subgroup of battery modules could be connected together so that all control switches in a subgroup receive the same enable input signal. In addition, the control outputs from all control switches in a control switch subgroup will be ORed together externally as a new enable input signal to enable a subsequent subgroup of control switches to activate its associated battery modules in the battery pack to output current concurrently. The same control switch design is applicable for a normal voltage and current output and an elevated voltage and current output.

To have a higher voltage and a higher current output from a battery pack at the same time is also possible in a power discharging configuration. This can be done by re-arranging the battery modules in a battery pack into multiple battery module subgroups and connecting the battery modules in each subgroup in series in advance, and then re-arranging the control switches in the control chain into multiple control switch subgroups where a control switch in each control switch subgroup is coupled to a subgroup of battery modules. The same enable input would be input to a subgroup of control switch. By asserting the same enable input signal to all control switches in a control switch subgroup, all respective battery module subgroups associated with the control switch subgroup will output current concurrently with elevated voltage. Similarly, the control outputs of all control switches in each control switch subgroup will be ORed together externally to become a new enable input to enable a subsequent subgroup of control switches in the discharging control chain. By simply increasing the number of battery modules being connected in series in a battery subgroup and increasing the number of battery subgroups to output current simultaneously to boost the output current, a higher output voltage with a higher output current is achievable.

BRIEF DESCRIPTION OF DRAWINGS

FIG. 1 illustrates an exemplary battery module power discharging configuration with control switches, in accordance with one embodiment of the present disclosure.

FIG. 2A shows a protection device adapted to prevent spurious energy discharge and deep energy depletion from degrading battery module, in accordance with one embodiment of the present disclosure.

FIG. 2B shows a protection device for a battery module, in accordance with one embodiment of the present disclosure.

FIG. 3 illustrates a battery module discharging control switch using back-to-back PMOS-FETs as a transfer device, in accordance with one embodiment of the present disclosure.

FIG. 4A shows a logic representation of a 1:2 demultiplexer, in accordance with one embodiment of the present disclosure.

FIG. 4B shows the application of 1:2 demultiplexer in a discharging control switch, in accordance with one embodiment of the present disclosure.

FIG. 5A illustrates a control switch using back-to-back NMOS-FETs as a transfer device, in accordance with one embodiment of the present disclosure.

FIG. 5B illustrates a control switch using an ADC to compose a comparison device, in accordance with one embodiment of the present disclosure.

FIG. 6 illustrates a power discharging control configuration with two battery modules connected in series to double the output voltage of a battery pack, in accordance with one embodiment of the present disclosure.

FIG. 7 illustrates a power discharging control configuration by activating two control switches concurrently to double output current of a battery pack, in accordance with one embodiment of the present disclosure.

DETAIL DESCRIPTIONS

The mileage anxiety discourages consumers from owning EVs. Slow level-1 or level-2 battery charging further cools off the impetus of owning an electric vehicle. For example, a level-1 EV charger being plugged into a 120V AC power outlet may top out at 2.4 KW at a 20 A outlet. For an EV with a battery capacity of 85 KWH, such as the one in Tesla Model S, it will take more than a day for a level-1 charger to fully charge its battery. If the battery is charged with a level-2 charger by plugging into a 240V 40 A AC outlet, which would top out at about 9.6 KW, or about 4 time faster than a level-1 charger, it would still take overnight to fully charge a Model S battery pack.

A more effective charging scheme is the use of a level-3 fast charger, such as the one from Tesla, which applies high DC voltage to charge a depleted battery pack to about 80% of full capacity in about 30 minutes. However, the Tesla level-3 chargers may not be available in every public location, nor is it compatible with the EV charger from other car makers. The proprietary fast charging scheme is a roadblock for many EV drivers on the road.

Battery Module Power Sequential Discharging Control Configuration

Where used, the term a "battery module" refers to a battery. Therefore, the terms "battery module" and "battery" are used herein interchangeably.

An embodiment to resolve the EV battery anxiety is described in detail below. One embodiment is to partition the battery pack in an EV into multiple removable battery modules (i.e., batteries) that could be easily removed and replaced by drivers or service shops. The set of removable battery modules in a battery pack are then under the control of an associated set of control switches, which form a power discharging configuration, to provide power sequentially for EV use, one at a time, until energy in the entire battery pack is used up. The energy status of battery modules in EV is observable so that driver can readily perceive if the number of fully charged battery modules is adequate for a trip. In case it is inadequate, drivers could stop by a service store to charge or to replace some depleted battery modules with fully charged ones to continue the journey until arriving at a destination, where all depleted battery modules could then be re-charged by using a level-1 or level-2 charger. This is similar to fueling gas for a car, where driver could gauge the gasoline status to fill gas at any gas station when gas level in an automobile is getting low.

The number of battery modules to be installed in an EV would be based on the characteristic of EV or based on the driving need. A smaller EV may install fewer battery modules in its battery pack. A larger EV or an EV requiring more electric power may equip with more battery modules or install ones that have higher energy capacity. For a shorter commute, fewer battery modules may be enough for EV use. In case of a need to visit a secluded area where no battery replacement service is available, spare battery modules may be carried on the road for replacement purpose. A would-be EV buyer may only buy a few battery modules initially to lower EV ownership cost and later add or rent more battery modules based on the usage need to fill spare battery module slots, for example, when on an extended trip.

The battery module may be designed in a standard form factor with common energy capacity, so that battery modules are compatible and interchangeable among different EVs. Then, instead of charging EV battery at a level-3 charging station when on the road, the battery fast charging may turn into a battery module replacement service at a battery service station or store that provides battery modules. The battery replacement can be done in a self-service manner by EV drivers, similar to self-service of gas fueling at a gas station.

FIG. 1 illustrates an exemplary battery module power sequential discharging configuration 100 in accordance with an embodiment of the present invention, where a battery pack 001 is partitioned into multiple removable battery modules 101, 102, . . . , 109, which are respectively controlled by a set of control switches 110, 120, . . . , 190. When KEY to a key switch 005 is pressed ON, a control signal BEN1 is asserted as an enable input to the first control switch 110. Although battery pack 001 is shown as including four battery modules, it is understood that a battery pack may have many more modules.

In FIG. 1, the control switch 110, which is coupled to the battery module 101, includes, in part, a comparison device, which is shown as a comparator 111 to compare an attenuated input with a reference voltage Vref. The attenuated input is derivable from a voltage divider R1 and R2, which is coupled to the output of battery module 101. The reference voltage Vref may be an external input or an internal voltage being set in control switch 110. If the comparator 111 detects that the attenuated voltage Vatt1 is higher than Vref, which means a sufficient energy in the battery module 101, then it will output a logic high to assert the enable-AND 112 when the second input signal to the enable-AND gate 112, namely signal BEN1, is also asserted. In addition, if Vref is an external input, a common Vref may be set as a common input to all battery modules in the battery pack.

The assertion of enable-AND 112 will activate a transfer device 113 in control switch 110 to transfer the voltage input VIN1, which is received from battery module 101 via switches 011, 021, and from which signal Vatt1 is derived, to VOUT1. The transfer device 113 may be an NMOS field-effect-transistor (FET), a PMOS-FET, a pair of back-to-back NMOS-FETs, a pair of back-to-back PMOS FETs, a bipolar junction transistor, a solid-state relay (SSR), an electromagnetic relay, and the like.

An output buffer 116, receiving signal from the output of comparator 111 and disposed in control switch 110 may be coupled to an external display device or an LED 117 as shown in FIG. 1. The LED 117 is lighted up when output of comparator 111 becomes high, which indicates a sufficient energy in the battery module 101.

As energy in the battery module 101 depletes, the output signal C1 of comparator 111 switches to a logic low. Signal C1 is inverted by inverter 114 and is applied to a first input terminal of link-AND 115, where the second input terminal of link-AND 115 receives another control input signal BEN1. When both input signals to link-AND 115 are at logic high level, the output of link-AND 115 goes high thereby to assert control signal BEN2, which in turn is configured to enable a subsequent control switch 120 in the sequential discharging chain 100 for power output. Control switches 110, 120, 130, . . . and 190 operate in the same manner. For example, the voltage output by battery module 102 received via switches 012 and 022 is attenuated by resistors R3 and R4 to generate voltage Vatt2 which is applied to comparator 121 disposed in control switch 120 associated with battery module 102. If the attenuated voltage Vatt2 is higher than Vref, then signal C2 will be at a logic high and the enable-AND gate 122 will be asserted to enable the transfer device 123 in control switch 120 to transfer VIN2 from battery module 102 to voltage VOUT2. Similarly, when energy in the battery module 102 falls below a pre-defined level, signal C2 will cause signal BEN3 to be asserted by the linked-AND 125 to enable next control switch 130 for power output. The same operation happens in control switches 130, . . . and 190.

The link-AND gates 115, 125, . . . , 195 may be connected in series to form a linked-AND chain. The linked-AND chain in the power sequential discharging control configuration 100 controls the sequential activation of control switches 110, 120, . . . , 190, which in-turn controls the sequential discharge of power in battery modules 101, 102, . . . , 109. The sequential activation takes place automatically without the intervention of an external microcontroller when the power discharging control chain 100 is switched on.

The sequential activation under the control of the linked-AND chain can skip any depleted battery modules in the battery pack 001. This is because the comparison device disposed in an associated control switch outputs logic low when energy in its battery module is depleted. This causes a logic high output at the linked-AND of the associated control switch and in turn will assert an enable input signal to enable its next control switch. Thereby, the depleted battery module is skipped for energy output. The linked-AND gate at the control switch in a control chain associated with a defective battery module, even a removed battery module, operates in the same manner when a defective battery module or a removed or uninstalled battery module is detected. In other words, all control switches being coupled to depleted, defective or vacant battery modules in a battery pack would be skipped during power output under the control of power sequential discharging control configuration 100, i.e. the power discharging control chain.

Thus, EV drivers may feel free to replace battery modules in any depleted positions, or may only replace a few of the depleted battery modules and postpone the charging of the entire battery pack until arriving at a destination, such as home. When fully charged battery modules are re-charged or re-installed in battery pack 001, the linked-AND chain will activate a first control switch in the power discharging chain 100 that has sufficient energy for output when the chain is switched on. Replacing only a portion of the depleted battery modules, in accordance with embodiments of the present disclosure, is analogous to partially fueling gas in a gas station, if EV driver chooses to do so.

A local power 199, such as a rechargeable battery, may be incorporated in the discharging control chain 100 to provide local power $V_{LOGIC}$ for control circuits. The $V_{LOGIC}$ may also be derived internally in a control switch.

Leakage Prevention for Battery Modules in Battery Pack

Switches 011 and 021, connected in series, may be incorporated between the battery module 101 and its associated control switch 110 to mitigate deterioration of battery lifetime. Similarly, switches 012, 022 may also be incorporated between the battery module 102 and its associated control switch 120, and the like The default state of switch 011, 012, . . . , 019, namely key-on switch, forming the switch set 133, is normally-open. When KEY at key switch 005 is pressed ON, a control signal BEN1 is asserted to enable the first control switch 110 to operate. The signal BEN1 also closes all key-on switches 011, 012, . . . , 019 in the switch set 133 in the discharging control chain 100. The normally-open key-on switches 011, 012, . . . , 019 prevent power leakage in battery modules 101, 102, . . . , 109 when EV is not in use.

The other set of switches 021, 022, . . . , 029, namely conjunction switch, forming the switch set 134, functions differently. The default state of conjunction switch 021, 022, . . . , 029 in the switch set 134 is normally-closed. As KEY at key-on switch 005 is pressed ON, the key-on switches 011, 012, . . . 019 and the conjunction switches 021, 022, . . . , 029 are both closed, so that energy in the battery modules 101, 102, . . . , 109 of battery pack 001 will be detected or received through comparison devices 111, 121, . . . , 191 to be observed at output buffers 116, 126, . . . , 129 in the respective control switches 110, 120, . . . , 190.

The output of status buffer 116, 126, . . . , 129 may be connected to external display device, such as a LCD panel or LEDs 117, 127, . . . , 197 shown in FIG. 1. Thus, an EV driver could observe the energy status in the entire battery pack 001 as key switch 005 in EV is pressed on.

The default state of conjunction switches 021, 022, . . . 029 in the discharging control chain 100 are normally-closed to enable power to pass on. As energy in the battery module 101 is depleted, being detected by the control switch 110, the link-AND 115 in control switch 110 will become high to assert a control output signal BEN2 to activate a subsequent control switch 120. In the meantime, the assertion of signal BEN2 will also open the conjunction switch 021 to disconnect the battery module 101 from EV power system to prevent further spurious depletion of energy in battery module 101, such as the leakage current through voltage divider R1, R2.

Similarly, the control switch 120 will assert a control output signal BEN3 to enable a subsequent control switch 130 and to open the conjunction switch 022 to disconnect the battery module 102 from the power system as energy in the associated battery module 102 is depleted. This process will proceed to open up all normally-closed conjunction switches to protect all depleted battery modules in the entire battery pack 001 under the control of the sequential discharging control chain 100.

The pair of switches that couple a battery module to an associated control switch form a protection device. For example, switches 011 and 021 form a first pair of protection devices for battery module 101, switches 012 and 022 form a second pair of protection devices for battery module 102, and so on. FIG. 2A shows an embodiment of a protection device 200, which prevents spurious battery discharging when EV is not in use, and further prevents deep energy depletion from deteriorating battery module when energy in battery is depleted during EV is powered on. The protection device 200 corresponds to any pair of the protection devices 011 and 021, 012 and 022, 013 and 023, and so on in the power discharging control chain 100.

In FIG. 2A, the key-on switch 220 is normally-open and is closed if KEY is pressed on. The default state of conjunction switch 230 is normally-closed, which enables power in the battery module 210 to transmit to control switch, but becomes open when signal NXEN, i.e. the control output signal to enable a subsequent control switch, is asserted. Signal NXEN corresponds to any of the signals BEN2, BEN3, BEN4, . . . and BEN9 in the power discharging control chain 100 of FIG. 1. An open conjunction switch 230 disconnects the output path of battery module 210 to its control switch. This takes place when energy in the battery module 210 falls below a minimum voltage level.

FIG. 2B shows an alternative implementation of a battery module protection device, in accordance with another embodiment of the present disclosure. In the protection device 250, a normally-open switch 270, namely a battery protection switch, is used instead. In the battery protection switch 270, a KEY input and an inverted NXEN input are ANDed as input to the switch 270. When NXEN is negated and KEY input is ON, the output of AND 265 will become high to close the normally-open battery protection switch 270 so as to enable energy in battery module 260 to output to the associated control switch. When NXEN is asserted or when KEY is OFF, the battery protection switch 270 will be open, i.e. back to its default state, to disconnect battery module 260 from its associated control switch to preserve battery energy. The key-on switch 220 of FIG. 2A, the conjunction switch 230 of FIG. 2A, and the battery protection switch 270 of FIG. 2B may be an electro-mechanical relay (EMR), a solid-state relay (SSR) or any other electric control switch in MOSFET or bipolar transistor.

Referring to FIG. 1, if signal KEY at key switch 005 in the discharging control chain 100 is switched OFF, the control signal BEN1 will be negated. The negation of BEN1 signal will cause all key-on switches 011, 012, . . . , 019 in FIG. 1 to reset to their default state to become open. The negation of BEN1 signal will also negate all successive BEN2, BEN3, . . . , BEN9 signals in the discharging control chain 100, so that the set of conjunction switches 021, 022, . . . , 029 will be closed, regardless of any of such switches being open due to depletion of energy in its prior battery module.

Thus, the connection between the battery module and its associated control switch will restore to its default state to become open as KEY at the key switch 005 is pressed OFF. Later, when KEY is pressed on, the battery modules in battery pack 001 will be re-connected to their respective control switches to divulge the energy status of entire battery pack, to output energy from battery module in a predetermined order if energy is available, and to disconnect the battery module from its respective control switch if energy in battery module is depleted under the control of the discharging control chain 100 with the protection device in place.

Control Switch for Battery Energy Discharging Control

FIG. 3 illustrates an exemplary discharging control switch 300 for controlling power output of a battery module, in accordance with an embodiment of the present disclosure. FIG. 3 also illustrates more details of a transfer device 350, such as the transfer devices 113, 123, 133, . . . , 193 in FIG. 1. The discharging control switch 300 corresponds to any of the discharging control switches 110, 120, 130, . . . , 190 in FIG. 1. Transfer device 350 shows a pair of back-to-back PMOS-FETs 317 and 318 that operate as power transfer device. In an embodiment, the discharging control switch 300 includes, in part, a comparison device, shown as a comparator 311 here to compare a voltage input ATTVIN with a reference voltage Vref, where ATTVIN is an attenuated voltage of VIN derived from voltage divider R1, R2, and VIN is the energy output from a battery module coupled to the control switch 300. Vref may be an internal set voltage or is connected to an external input VREF.

When a control input EN to the control switch 300 is asserted and when the output of comparator 311 is a logic high, which means there is sufficient energy in its associated battery module, then the Enable-AND 312 will be also a logic high signal to enable the transfer devices PMOS-FETs 317, 318 to transfer power from terminal VIN to terminal VOUT. Using a pair of MOS-FETs as power transfer device is advantageous. The drain-to-source body diode of PMOS-FET 317 blocks reverse current from VOUT to VIN, when output voltage VIN at associated battery module is lower than VOUT. The drain-to-source body diode of PMOS-FET 318 blocks the leakage current from VIN to VOUT, if a fully charged battery module controlled by control switch 300 is not ready to output power yet.

Resistor R3 and NMOS-FET 313 form an inverter in resistor-transistor logic (RTL). The RTL pull-up voltage for the inverter, formed by R3 and NMOS-FET 313, is sourced by VIN through the body diode of PMOS-FET 317. The inverter function is required for the pair of active-low PMOS-FETs 317, 318, but is not required if active-high NMOS-FETs are chosen as power transfer device in control switch.

If the output of comparator 311 becomes low, which means energy in an associated battery module is dropped or depleted and no longer has sufficient energy, then the inverted output of comparator 311 by inverter 314 will become a logic high (high), thus causing the output of link-AND 315 to be high too, if EN is also asserted. A high at output of link-AND 315 will assert the control output NXEN to activate a subsequent control switch in the discharging control chain. Using FIG. 1 as an example, the control switch 120 is considered as a subsequent control switch to the control switch 110, if battery module 102 has sufficient energy for output. Otherwise, the control switch 130 is considered as a subsequent control switch to the control switch 110, if battery module 103 has sufficient energy for output, and the like.

Buffer 316 delivers the output of comparator 321 for external observation at BATTERY STATUS terminal to indicate the energy status of battery module coupled to control switch 300. The enable-AND 312, the inverter 324, and the link-AND 315 form a 1:2 demultiplexer 320 in the control switch 300, where the output of comparator 311 is the demultiplexer select control signal 321 to select between two demultiplexer outputs, i.e. the Enable-AND 312 and the link-AND 315, with EN as the demultiplexer input. The control switch may be an integrated-circuit. It may be implemented using discrete electronic devices or implemented as a set of chiplets in multiple-chip package (MCP).

FIG. 4A shows a logic representation of a 1:2 demultiplexer 400, where if the demultiplexer's select control signal CNTL is 0, then the demultiplexer input IN will be forwarded to demultiplexer output OUT0. And if the demultiplexer select control signal CNTL is 1, then the demultiplexer input IN will be forwarded to demultiplexer output OUT1.

According to which, FIG. 4B shows the Link-AND 315, the Enable-AND 312 and the inverter 314 in control switch 300 of FIG. 3 form a 1:2 demultiplexer 320, where the enable input EN is the demultiplexer input signal and the output of comparator 311 is the demultiplexer select control signal 321. If the enable input EN (the demultiplexer input) is asserted and if the comparator output (the demultiplexer select control terminal) is high, then the enable-AND 312 will pass on the signal EN, when asserted, to enable the transfer device disposed in the control switch to output power from its associated battery module to the output of control switch and in turn to the output of battery pack.

On the contrary, if the enable input EN is asserted but the comparator output is low, then the link-AND 315 will assert signal NXEN at its output to activate a subsequent control switch in the discharging chain for power output. However, when the enable input EN is negated, both outputs of 1:2 demultiplexer will be negated and the control switch 300 would become inactive in the discharging control chain.

FIG. 5A illustrates another exemplary discharging control switch 500 for controlling power output of a battery module, in accordance with an embodiment of the present disclosure. The discharging control switch 500 corresponds to any of the discharging control switches 110, 120, 130, . . . and 190 shown in FIG. 1, where the back-to-back NMOS-FETs 517 and 518 form a transfer device, corresponds to any of the transfer devices 113, 123, 133, . . . and 193. The comparison device in control switch 500 may be a comparator 511 composing of an operational amplifier which outputs a logic high or is saturated at an asserted state when its input voltage VINATT is higher than a reference voltage Vref, and outputs a logic low or is saturated at a de-asserted state when the VINATT input is lower than the reference voltage Vref. The VINATT is an attenuated voltage derived from the voltage output of battery module associated with control switch 500. The Vref may be an internal voltage or an external input VREF. If Vref is an external input, the VREF to all control switches may be connected to and controlled by the same reference voltage to ensure energy in all battery modules are depleted or reduced to the same low level.

Some aspects of the embodiment shown in FIG. 5A including devices to prevent abnormalities from damaging control switch 500. For example, to protect against failures due to high voltage surge, control switch 500 is adapted to include an overvoltage lockout (OVLO) circuit that includes, in part, comparator 512 to lockout the control switch 500 when the input voltage exceeds a pre-defined limit. An electric transient surge voltage may cause avalanche breakdown in a solid-state device, which may damage control switch. The overvoltage comparator 512 compares Vref with an attenuated voltage input OVLO. The voltage OVLO is lower than VINATT due to the resistor R3 being added between a terminal of resistor R2 and the ground.

During normal operation, the voltage OVLO is lower than Vref and the output of comparator 512 will be at logic high, thereby causing no impact on the output of AND gate 513. However, if the voltage OVLO becomes higher than Vref during a power surge, then the output of overvoltage comparator 512 will go low, thus causing output of AND gate 513, being the select control terminal of a 1:2 demultiplexer, composed of AND gates 515, 522 and inverter 521 as described above with reference to FIG. 4B, to go low. A logic low at the select control terminal of the demultiplexer will disable the power transfer device in control switch 500 and enable a subsequent control switch in the discharging control chain for power output. The transfer device formed by NMOS-FETs 517, 518 in control switch 500 will be locked-out by an overvoltage, if the OVLO is higher than Vref.

Additional protection mechanisms for the control switch 500, such as a slew rate control device 523 to smooth out the voltage spike from VIN when the battery module is initially switched on, or a current sensing device 514 to monitor and ensure current entering control switch 500 does not exceed a pre-defined limit, or a temperature sensor which senses junction temperature at transfer device to protect the transfer device from being over-heated, all or part of such may be included in the control switch 500. The output of the abnormality detection devices may be input to AND 513 if the detected abnormality signal is asserted low, or input to NOR 519 if the detected abnormality signal is asserted high, so as to negate the output of comparator 511 at AND 513 in FIG. 5A. The output of AND 513 is the control signal input to the demultiplexer select control terminal. A de-asserted demultiplexer select control signal will activate a subsequent control switch in the discharging control chain.

The pair of active-high NMOS-FETs 517, 518 in control switch 500 is connected to the output of charge pump 520 to boost gate voltages to a level higher than the source voltage to enhance channel conduction in NMOS FET. The body diodes in the pair of NMOS-FETs 517, 518 block reverse current when voltage VOUT is higher than Vin and provide forward leakage protection when a fully charged battery module is not yet activated for power output. Resistor R4 together with NMOS-FET 527 and inverter 526 form an open-drain status buffer 525, where the output of comparator 511 is observable at an output terminal BSTA to divulge the energy status in the associated battery module of control switch 500.

Other embodiments of control switch design within scope of present disclosure include such the one shown in FIG. 5B, where the comparison device may be composed of an analog-to-digital converter (ADC) 535 with output of ADC 535 being connected to a magnitude comparator 536 to compare with a reference value CMPVAL, which reflects the minimum voltage requirement in an associated battery module to generate a comparison output signal as input to the AND gate 560, similar to the output of comparator 511 being input to the AND gate 513 in FIG. 5A. The comparison output of magnitude comparator 536 becomes the select control signal of 1:2 demultiplexer in FIG. 5B to control the power switching in control switch 550. The magnitude comparator 536 may be a discrete device or may be implemented with a programmable logic device (PLD), or the like.

In addition, the status buffer 525 in FIG. 5A, which includers inverter 526 and NMOS-FET 527, and a status bit BSTA in control switch 500, may be replaced by an I/O interface unit 537 and a multi-bit I/O STATUS PORT, which is connected to an external I/O interface, such as a two-bit $I^2C$ interface or a controller area network (CAN) interface at the STSTUS PORT in FIG. 5B. A higher resolution on the energy status in battery module may be observable at an external display device, such as an LCD panel, if the ADC output is accessible from the I/O interface unit 537. The number CMPVAL reflecting the minimum voltage requirement in magnitude comparator 536 may be hard-wired or embedded in the control switch 550, or is programmed into a memory device, such as an electrically erasable programmable read-only memory (EEPROM) accessible through the I/O interface unit 537 and the I/O STATUS PORT.

In summary, a control switch comprises an enable input port to receive an enable input signal, a control output port to assert a control output signal, a power input port, a power output port, a power transfer device adapted to transfer an input power received from the power input port to the power output port when the power transfer device is enabled, and a comparison device adapted to compare an external voltage with a reference voltage to generate a comparison output.

The control switch further comprises a switching control comprising a 1:2 demultiplexing logic having a demultiplex input coupled to the enable input signal and a demultiplex select control signal coupled to the comparison output, where when the enable input signal is asserted, the demultiplex input, namely the enable input signal, is forwarded by the 1:2 demultiplexing logic to a first demultiplexing output port to enable the power transfer device which is adapted to transfer power at the power input port received from a battery module associated with the control switch to the power output port when the comparison output or the demultiplex select signal is asserted; moreover, the demultiplex input is forwarded by the 1:2 demultiplexing logic to a second demultiplex output port to assert the control output signal, which can be input to an enable input port as a demultiplex input of a subsequent control switch, when the demultiplex select signal is de-asserted.

Furthermore, the control output port of a control switch can be linked to the enable input port a subsequent control switch thereby forming a link-control chain to control automatic power switching of associated battery modules in a battery power system.

Incorporating the demultiplexing logic in a control switch enables concurrent switching between a control switch and a subsequent control switch, so is between an associated battery module and a subsequent associated battery module, when the demultiplex select signal changes state, thereby minimizing transient noise and glitches during power switching.

Boosting Output Voltage and Current at Battery Pack

In one embodiment, the battery modules and the associated control switches may be configured to boost the output voltage and/or the output current at a battery pack. This could be done by re-arranging the multiple of battery modules in a battery pack into multiple subgroups, and then connecting battery modules in each subgroup in series prior to input to a control switch associated with the subgroup of battery modules to output an elevated voltage from control switch. Similarly, it is possible to boost the output current from a battery pack by enabling a subgroup of control switches in the discharging control chain to activate an associated subgroup of battery modules in battery pack to output power concurrently.

FIG. 6 shows an exemplary power discharging control configuration 601 including four battery modules 610, 620, 630 and 640, where battery modules 610 and 620 are connected in series, so are the battery modules 630 and 640. Although battery pack 600 is shown as including four battery modules, it is understood that a battery pack may have many more battery modules. The power discharging control configuration 601 is adapted to double the output voltage, where the positive terminal of battery module 610 is connected to the negative terminal of battery module 620, and the positive terminal of battery module 620 is output to an associated control switch 650 while the negative terminal of battery module 610 may be connected to the chassis ground of EV.

In a manner similar to that described with reference to FIG. 1, as KEY at key switch 605 is pressed ON, signal DBEN1 is asserted to enable control switch 650 to control the voltage output of the pair of serially connected battery modules 610 and 620. Activating the signal KEY also closes all key-on switches 611, 621, . . . , 641 in the power discharging control configuration 601. This enables energy in each pair of battery modules 610/620, 630/640 . . . . in battery pack 600 to be monitored by the comparator 623, 643. disposed respectively in associated control switch 650, 660. The monitored voltages, which respectively represent the amount of energy at each pair of battery modules in battery pack 600, are observable at the output of respective buffers 627, 647.

The output voltage 2XVIN from the pair of battery modules 610, 620 is attenuated by a voltage divider R1, R2 before being applied to comparator 623 disposed in control switch 650. The voltage 2XVIN is twice the voltage of single battery module's output voltage VIN. Comparator 623 is adapted to compare the attenuated voltage with a reference voltage 2XVref, which may be a value that is, for example, twice of the voltage Vref shown in FIG. 1, or another voltage value. Voltage 2XVref may be an internal voltage or an external input to the control switch 650.

When there is sufficient energy in the pair of battery modules 610, 620, the output of comparator 623 in associated control switch 650 will be a logic high. If signal DBEN1 is also asserted, then the enable-AND 624 will be asserted to transfer the voltage 2XVIN from the pair of serially connected battery modules 610, 620 to output node VBPACK of battery pack 600. However, if the attenuated voltage input to comparator 623 falls below 2XVref, then the transfer device 625 in control switch 650 will be disabled and a control output signal DBEN2 will be asserted by the linked-AND 628 to switch off the pair of conjunction switches 612, 622 coupled to the battery modules 610, 620 and at the same time to enable a subsequent control switch 660 to output twice-voltage to node VBPACK, if both battery modules have sufficient energy available.

As the key switch 605 is pressed ON (activated), a display device, such as the LEDs 629, 649, as shown in FIG. 6, may light up to indicate the energy status of all subgroups of battery modules 610, 620 and 630, 640 in battery pack 600. The number of control switches in a power discharging control configuration 601 having twice voltage at output could be reduced by half.

In one embodiment, to boost output current from a battery pack, a subgroup of control switches in the discharging control chain could be enabled together so that their associated battery modules the battery pack could output current in parallel. This could be done by connecting the same enable inputs to all control switches in the subgroup, then the assertion of an enable input to all control switches in the control switch subgroup could enable all associated battery modules to output currents concurrently to boost current output. In addition, the control outputs from all control switches in the control switch subgroup may be ORed together to become a new enable input to a subsequent control switch subgroup for parallel current output. The control switch being used for elevated current and higher voltage output is the same as the control switch being used in normal current and voltage output.

FIG. 7 shows an exemplary sequential power discharging control configuration 701 having the output current from battery pack 700 doubled. Although battery pack 700 shown only includes four battery modules, it is understood that a battery pack may comprise many more battery modules. In the battery pack 700, when KEY at the key switch 705 is pressed on, the enable signal DBEN1 is asserted to activate two control switches 750, 760, so that energy VIN1 and VIN2 from their two associated battery modules 710, 720 are output concurrently through the two control switches 750, 760 to battery pack output node VBPACK to double the output current. The outputs of all control switches in a battery pack are ORed together at VBPACK.

If energy in any of the battery modules 710, 720 is depleted, then at least one output of linked-AND 717, 727 will go high. By ORing the output of two linked-AND 717, 727 together at OR gate 728, the ORed output being the node DBEN3 will become high to enable a subsequent pair of control switches 770, 780 in the power discharging control configuration 701, also to double the output current to VBPACK. The assertion of signal DBEN3 also disconnects the pair of conjunction switches 712, 722 coupled to the output of battery modules 710, 720, which prevents further depletion of energy in the pair of depleted battery modules 710, 720.

In one embodiment, a higher voltage and a higher current output can also be output from a battery pack using similar control switch. This is achieved by connecting a subset of battery modules in series in a battery module subgroup in advance to raise up the output voltage, and then enabling multiple similar subgroups of battery modules to output power concurrently to boost output current under the control of a subgroup of control switches where each control switch in the control switch subgroup controls the power output of a subgroup of battery modules. The control outputs from the subgroup of control switches are ORed together to become a new enable control signal to enable a next subgroup of control switches in the power discharging control configuration 701. The new ORed control output is asserted if the energy in any of the battery module subgroups falls below a predefined value.

CONCLUSION

By partitioning a battery pack into multiple removable and replaceable battery modules and using a power discharging control chain to control an orderly discharge of power from battery modules, battery configuration in an EV would be more versatile and efficient to resolve the power charging constraints, with seamless power switching among battery modules without the involvement of an external micro-controller.

The output voltage and output current from a battery pack are also adjustable, by grouping battery modules in a battery pack in series and their associated control switches in a discharging control configuration in parallel for power output control. Battery protection device may also be included in the power discharging control configuration to prevent a spurious battery discharge when EV is switched off and to prohibit a deep energy depletion from deteriorating a depleted battery module when EV is powered on.

Rather than continuously pursuing a larger battery pack with higher energy storage capacity to increase driving range, which would be more expensive for consumers at a higher EV cost and may end up with a heavier EV, which is adverse for EV. The adoption of removable and replaceable battery modules in a battery pack is an effective way to address EV mileage anxiety with potential to lower EV cost.

It may be inappropriate for an EV to carry a large battery pack all the time. Removing some battery modules from EV if it is for a routine short commute to minimize vehicle weight overhead and adding more battery modules back to EV for longer distance driving under the discretion of EV owners could be more efficient in EV energy usage. It may accelerate the EV acceptance, if the EV price could be reduced by lowering the battery ownership cost and if the battery modules could be widely available so that some depleted batteries could be easily replaced in most places or charged in just a short duration to bring more convenience for EV drivers, similar to a quick re-fueling of gas for a car in gas stations when on the road.

What is claimed is:

1. A control switch comprising
    an enable input port to receive an enable input signal;
    a control output port to assert a control output signal;
    a power input port;
    a power output port;
    a power transfer device;
    a comparison device adapted to compare an external voltage with a reference voltage to generate a comparison output;
    a switching control comprising a 1:2 demultiplexing logic having a demultiplex input coupled to the enable input signal and a demultiplex select signal coupled to the comparison output, wherein when the enable input signal is asserted,
        the demultiplex input is forwarded by the 1:2 demultiplexing logic to a first demultiplex output port to enable the power transfer device to transfer an input power at the power input port received from a battery associated with the control switch to the power output port when the comparison output is asserted, and
        the demultiplex input is forwarded by the 1:2 demultiplexing logic to a second demultiplex output port to assert the control output signal, which is an input to an enable input port as a demultiplex input of a subsequent control switch, when the demultiplexing select signal is de-asserted.

2. The control switch of claim 1 wherein
    the control output port of the control switch is linked to the enable input port of the subsequent switch thereby forming a link-control chain to control automatic power switching of associated batteries.

3. The control switch of claim 1 wherein
    the 1:2 demultiplexing logic facilitates concurrent switching between the control switch and the subsequent control switch when the demultiplexing select signal changes state.

4. The control switch of claim 1 wherein
    the power input port includes a slew rate control device.

5. The control switch of claim 1 wherein the demultiplexing select signal is de-asserted when one or more abnormalities of current surge, overvoltage lockout, or thermal overheat take place.

6. The control switch of claim 1 wherein the power transfer device is selected from a group consisting of a NMOS field-effect transistor (FET), a PMOS FET, a pair back-to-back NMOS FETs, a pair of back-to-back PMOS FETs, a bipolar junction transistor, an electromechanical relay, and a solid-state relay.

7. The control switch of claim 1 wherein the comparison device is an operational amplifier, wherein the comparison output saturates at an asserted state when the external voltage is higher than the reference voltage and saturates at a de-asserted state when the external voltage is lower than the reference voltage.

8. The control switch of claim 1 further comprising a status output bit adapted for external observation of the comparison output.

9. The control switch of claim 1 wherein the comparison device is an AC-DC converter (ADC), wherein an output of the ADC is input to a magnitude comparator to generate the comparison output, wherein the comparison output is asserted when the output of the ADC is higher than a set value applied to the magnitude comparator and the comparison output is de-asserted when the output of the ADC is lower than the set value.

10. The control switch of claim 9 wherein the set value in the magnitude comparator is embedded in the control switch or is programmed in an internal memory device.

11. The control switch of claim 9 further comprising a status I/O port coupled to the I/O interface block and adapted for display device to enable observation of the output of the ADC.

12. The control switch of claim 1 wherein the external voltage is an attenuated voltage of the input power.

13. The control switch of claim 1 wherein the control switch is implemented as an integrated-circuit.

14. The control switch of claim 1 wherein the control switch is implemented with discrete electronic devices.

15. The control switch of claim 1 wherein the control switch is implemented by a set of chiplets, assembled in a multiple-chip package (MCP).

16. A power discharging system comprising a plurality of batteries and a plurality of control switches, wherein a first one of the plurality of control switches comprises:
- an enable input port to receive an enable input signal;
- a control output port to assert a control output signal;
- a power input port;
- a power output port;
- a power transfer device;
- a comparison device adapted to compare an external voltage with a reference voltage to generate a comparison output;
- a switching control comprising a 1:2 demultiplexing logic having a demultiplex input coupled to the enable input signal and a demultiplex select signal coupled to the comparison output, wherein
  - when the enable input signal is asserted, the demultiplex input is forwarded by the 1:2 demultiplexing logic to a first demultiplex output port to enable the power transfer device to transfer an input power at the power input port received from a first battery associated with the first control switch to the power output port when the comparison output is asserted, and
  - the demultiplex input is forwarded by the 1:2 demultiplexing logic to a second demultiplex output port to assert the control output signal coupled to an enable input port as an enable input signal to enable a second one of the plurality of control switches to transfer power received from a second battery to a power output port of the second control switch when the demultiplex select signal is de-asserted and when the second battery being associated with the second control switch has sufficient energy for output; and
  - the control output port of the first control switch being linked to an enable input port of the second control switch thereby forming a control chain to control power switching of associated batteries in the power discharging system.

17. The power discharging system of claim 16 wherein the switching control enables concurrent switching between the first control switch and the second control switch, and further enables concurrent switching between the first battery and the second battery, when the demultiplex select signal changes state.

18. The power discharging system of claim 16 wherein the power discharging system is a battery system in an electric vehicle (EV), the battery system being partitioned into a plurality of batteries that are under control of a plurality of associated control switches being linked sequentially to form the control chain to control power discharge of the plurality of batteries in the battery system, wherein the plurality of batteries comprises the first and second batteries.

19. The power discharging system of claim 18 wherein the plurality of batteries is removable and replaceable.

20. The power discharging system of claim 16 wherein the power output port of the first control switch and the power output port of the second control switch are coupled to one another to provide an output power of the power discharging system.

21. The power discharging system of claim 16 wherein the demultiplex select signal is de-asserted when one or more of overvoltage lockout, thermal overheat, or current surge abnormalities take place.

22. The power discharging system of claim 16 wherein the comparison device is an operational amplifier, wherein the comparison output saturates at an asserted state when the external voltage is higher than the reference voltage and saturates at a de-asserted state when the external voltage is lower than the reference voltage.

23. The power discharging system of claim 16 wherein the comparison device is an AC-DC converter (ADC), wherein an output of the ADC is input to a magnitude comparator to generate the comparison output, wherein
  the comparison output is asserted when the output of the ADC is higher than a set value applied to the magnitude comparator and the comparison output is de-asserted when the output of the ADC is lower than the set value.

24. The power discharging system of claim 16 wherein the first battery and the second battery are connected in series prior to input to a control switch in the plurality of control switches to boost output voltage of the power discharging system.

25. The power discharging system of claim 16, wherein the enable input port of the first control switch is coupled to the enable input port of the second control switch to form a set of coupled control switches, thereby causing the first battery and the second battery associated with the set of coupled control switches to output powers in parallel to boost output current for the power discharging system.

26. The power discharging system of claim 25, wherein a signal output from the control output port of the first control switch is ORed with a signal output from a control output port of the second control switch thereby forming a second enable input signal to enable a subsequent set of coupled control switches in the plurality of control switches for activating an associated set of batteries in the plurality of batteries to output current in parallel.

27. The power discharging system of claim 16, wherein when the control output signal in a $k^{th}$ control switch of the plurality of control switches is asserted and if the comparison output of a $(k+1)^{th}$ control switch is de-asserted, then the control output signal from the $k^{th}$ control switch will cause a $(k+2)^{th}$ control switch associated with a $(k+2)^{th}$ battery of the plurality of batteries to be activated to detect whether a voltage received from the $(k+2)^{th}$ battery exceeds the reference voltage to determine if the $(k+2)^{th}$ battery will be enabled to output power for the power distribution system.

28. An apparatus adapted to protect a battery in a power discharging system, wherein an input port of the apparatus is coupled to an output port of the battery, and an output port of the apparatus is coupled to a power input port of a control switch which controls power output of the battery, wherein the apparatus comprises:
   a key-on switch which is caused to open when the power discharging system is switched off, and is caused to close when the power discharging system is switched on; and
   a conjunction switch which is caused to close when the power discharging system is switched off, and is caused to open when a power of the battery is detected by the control switch being smaller than a predefined value.

29. The apparatus of claim 28, wherein the key-on switch and the conjunction switch are connected in series.

30. The apparatus of claim 28, wherein the apparatus comprises a protection switch controlled by one or more logic gates performing a Boolean AND function, wherein
   an output of the AND function is asserted to close the protection switch when the power discharging system is switched on;
   the output of the AND function is negated to open the protection switch when the power discharging system is switched off; and
   the output of the AND function is negated to open the protection switch to prevent deep power depletion when power in the battery is detected by the control switch to be less than a predefined value, wherein the output of the AND function is negated while the power discharging system is switched on.

31. A power system comprising a plurality of batteries, a plurality of battery protection devices each coupled to a different one of the plurality batteries, and a plurality of control switches each coupled to a different one of the plurality of battery protection devices, wherein
   an output power of a $k^{th}$ battery in the plurality of batteries being coupled to an input port of a $k^{th}$ battery protection device in the plurality of battery protection devices, and an output port of the $k^{th}$ protection device being coupled to a power input of a $k^{th}$ control switch in the plurality of control switches; wherein each battery protection device comprises:
   a key-on switch which is caused to open when the power system is switched off and is caused to close when the power system is switched on, and
   a conjunction switch in serial connection with the key-on switch wherein the conjunction switch is caused to close when the power system is switched off and is caused to open when voltage in the conjunction switch's associated battery is detected being less than a predefined value.

32. The power system of claim 31, wherein the key-on switch and the conjunction switch in each battery protection device is re-configured as a single protection switch controlled by one or more logic gates performing a Boolean AND function, wherein
   an output of the AND function is asserted to close the single protection switch when the power system is switched on;
   the output of the AND function is negated to open the single protection switch when the power system is switched off; and
   the output of the AND function is negated to open the single protection switch to prevent deep power depletion in the coupled battery when power in the coupled battery being detected by the coupled control switch to be less than the predefined value, wherein output of the AND function remains negated while the power system is being switched on.

33. The power system of claim 31, wherein
   when the power system is switched on, an enable input to a first control switch is asserted to activate the first control switch and to close all key-on switches in the plurality of battery protection devices so that power output of each of the plurality of batteries is connected to power input of its coupled control switch in the plurality of control switches, wherein
   when power in the first battery is detected as being less than the predefined value, a first control output from the first control switch is asserted in order to:
      enable a second control switch to activate a second module for power output,
      switch off a first conjunction switch of the first battery protection device to disconnect the first battery from the power system; and
   when power in the second battery is detected as being less than the predefined level, a second control output from the second control switch is asserted in order to:
      enable a third control switch to activate a third battery for power output; and
      switch off a second conjunction switch of the second battery protection device to disconnect the second battery from the power system.

* * * * *